United States Patent [19]

Covington

[11] Patent Number: 5,765,892
[45] Date of Patent: Jun. 16, 1998

[54] EXTENSION APPARATUS FOR A VEHICLE CARGO AREA

[76] Inventor: James Roy Covington, 917 Lombardy Dr., Plano, Tex. 75023

[21] Appl. No.: 538,964

[22] Filed: Oct. 5, 1995

[51] Int. Cl.$^6$ ................................................ B62D 33/08
[52] U.S. Cl. .................................. 296/26; 296/57.1
[58] Field of Search ........................... 296/26, 57.1, 3, 296/32; 266/36, 63, 64, 56

[56] References Cited

U.S. PATENT DOCUMENTS

| | | | |
|---|---|---|---|
| 2,711,342 | 6/1955 | Selzer | 296/51 |
| 2,729,499 | 1/1956 | Eggum | 296/26 |
| 2,872,239 | 2/1959 | Bowness et al. | 296/26 |
| 4,472,639 | 9/1984 | Bianchi | 296/26 |
| 4,531,773 | 7/1985 | Smith | 296/26 |
| 4,778,213 | 10/1988 | Palmer | 296/26 |
| 5,087,091 | 2/1992 | Madill | 296/26 |
| 5,154,470 | 10/1992 | Bringman, Jr. | 296/26 |
| 5,468,037 | 11/1995 | Peterson | 296/57.1 |
| 5,533,771 | 7/1996 | Taylor et al. | 296/26 |

FOREIGN PATENT DOCUMENTS

| | | | |
|---|---|---|---|
| 1244858 | 11/1988 | Canada | 296/57 |

*Primary Examiner*—David M. Mitchell
*Attorney, Agent, or Firm*—Hitt Chwang & Gaines, PC

[57] ABSTRACT

The present invention provides an extension apparatus for use with a vehicle having a cargo-bed area with opposing first and second side walls, and a tailgate movable between a vertical orientation and a horizontal orientation. The extension apparatus comprises a rear panel, which has opposing first and second ends, pivotally couplable to the tailgate to pivot the rear panel between a side-board configuration and a cargo-bed extension configuration. A first side panel is pivotally coupled to the rear panel adjacent the first end, and a second side panel is pivotally coupled to the rear panel adjacent the second end. The extension apparatus further includes a side panel receiver securable to a selected one of the first or second side walls of the cargo-bed area to receive a portion of the selected one of the first or second side panels therein. The unique configuration of the extension apparatus allows the extension apparatus to expand the cargo-bed area in a vertical direction when the rear panel is pivoted to the side-board configuration, or alternatively, to expand the cargo-bed area in a horizontal direction when the rear panel is pivoted to the cargo-bed extension configuration.

18 Claims, 6 Drawing Sheets

EXTENSION APPARATUS FOR A VEHICLE CARGO AREA

TECHNICAL FIELD OF THE INVENTION

The present invention is directed, in general, to an apparatus for use with a vehicle having a cargo area and, more specifically, to an extension apparatus for optionally expanding the cargo space in such vehicles either vertically or horizontally with respect to the cargo area.

BACKGROUND OF THE INVENTION

Operators of pickup trucks, station wagons or other vehicles having tailgates or cargo areas sometimes find it necessary to transport articles that do not fit within the available cargo space when the tailgate is in the upright, closed position. This has become a more common occurrence with the recent increased usage of small economy sized vehicles.

In transporting objects or cargo that exceed the cargo area of such vehicles, containment problems may arise in vehicles with conventional tailgates if such tailgates are left open in order to accommodate the excessive load. Time consuming efforts to secure the load in place are usually needed to prevent the possible loss of the load during transportation. As a practical matter, such loads are sometimes inadequately secured. The resulting loss of articles during transportation is not only undesirable in itself but can also be a safety hazard to the occupants of other vehicles. Transportation of loads with a conventional tailgate in the open position may also require that the vehicle be driven more slowly than would otherwise be necessary.

To overcome these problems, several different extension devices have been developed. For instance, U.S. Pat. No. 4,472,639 to Bianchi discloses a retractable extender structure for the tailgate of a pick-up truck or other vehicle that allow expansion of the cargo area. A back panel and side panels are compactly carried against the inside surface of the closed tailgate when not in use and are pivotable into a perpendicular relationship with respect to each other when the tailgate is open to increase the cargo space. Another example is U.S. Pat. No. 4,531,773 to Smith that discloses a foldable container slidably connected to a pair of slide guides that are adapted to be secured to opposite sides of a vehicle tailgate. The pair of side panels are hinged to opposite sides of the rear panel and are moveable between a stored position overlying the rear panel and an operative position perpendicular to the rear panel. The device slides between a forward stored position and a rear operative position that expands the cargo area in a horizontal direction with respect to the vehicle. Another example U.S. Pat. No. 4,778,213 to Palmer that discloses an extension device including two side panels that are attached to the main tailgate of the vehicle in positions parallel to one another and for swinging movement with the main tailgate between its open and closed positions, an auxiliary tailgate which projects upwardly from a rear edge of the main tailgate in the open position of the main tailgate, and a hinge structure mounting the auxiliary tailgate for swinging movement relative to the main tailgate and relative to the side panels. The effect of this device is to extend the cargo area in a horizontal direction with respect to the vehicle.

While these devices are useful in expanding the cargo space of the vehicle, they are useful in expanding the cargo area in only the horizontal direction with respect to the vehicle. In many instances, it is desirable to provide sideboards for the cargo area to allow the cargo to be stacked above the main cargo area. In conventional devices, these side-boards are separate auxiliary devices that must be separately coupled to the cargo area to extend the cargo area in the vertical direction. Thus, the user is faced with the necessity of purchasing two separate devices if the user desires to expand the cargo area in either a horizontal or vertical direction with respect to the cargo area.

Accordingly, there is a need in the art for an expansion apparatus that can be used to expand the cargo area of a vehicle in either a horizontal direction with respect to the vehicle or, alternatively, a vertical direction if so required. The present invention provides an expansion apparatus that addresses this need.

SUMMARY OF THE INVENTION

To address the above-discussed deficiencies of the prior art, the present invention provides, for use with a vehicle having a cargo-bed area with opposing first and second side walls, and a tailgate movable between a vertical orientation and a horizontal orientation, an extension apparatus. In a preferred embodiment, the extension apparatus comprises a rear panel, which has opposing first and second ends, pivotally couplable to the tailgate to pivot the rear panel between a side-board configuration and a cargo-bed extension configuration. A first side panel is pivotally coupled to the rear panel adjacent the first end, and a second side panel is pivotally coupled to the rear panel adjacent the second end. The extension apparatus further includes a side panel receiver securable to a selected one of the first or second side walls of the cargo-bed area to receive a portion of the selected one of the first or second side panels therein. The unique configuration of this extension apparatus offers advantages over the above-discussed prior art devices in that it allows the extension apparatus to expand the cargo-bed area in a vertical direction when the rear panel is pivoted to the side-board configuration, or alternatively, to expand the cargo-bed area in a horizontal direction when the rear panel is pivoted to the cargo-bed extension configuration.

In a preferred embodiment, the extension apparatus further comprises a releasable lock mechanism associated with the side panel receiver to lock the extension apparatus in the side-board configuration. The lock mechanism preferably comprises a spring loaded lock pin that is coupled to the side panel receiver and that is engageable with the edge of the panel receiver. This allows the user to conveniently lock the expansion apparatus in place and not have to worry about loosing a pin since the pin is coupled to the spring member.

In another embodiment, the side panel receiver is a first panel receiver securable to the first side wall and the extension apparatus further comprises a second side panel receiver securable to the second side wall of the cargo-bed area opposite the first side panel receiver. The second side panel receiver is also configured to receive a portion of the second side panel when the rear panel is pivoted to the side-board configuration. Preferably, a releasable lock mechanism is associated with each of the first and second panel receivers to lock the extension apparatus in the side-board configuration. Preferably, the lock mechanism comprises a spring loaded lock pin that is coupled to each of the first and second side panel receivers and that is engageable with the edge of the first and second side panels. The presence of opposing side panel receivers provides for greater stability and strength that can provide support for heavier loads as opposed to when just one side panel receiver is present.

In another aspect of the present invention, the rear panel is pivotally coupled to the tailgate by a double-jointed hinge that allows the extension apparatus to be pivoted to a loading position wherein the extension apparatus is positioned below the cargo-bed area. Preferably the double-jointed hinge is a Z-hinge and the first and second side panels are pivotally coupled to the rear panel by an offset hinge. The double-jointed hinge allows the expansion apparatus to easily pivot between the side-board configuration and the cargo-area expansion configuration without causing excessive strain on the hinge member, and it also allows the expansion apparatus to be maintained in a more correct alignment than other conventional hinges.

In another aspect, the present invention also provides a tailgate side panel receiver that is securable to the tailgate. The tailgate side panel receiver is configured to receive a portion of a selected one of the first or second side panels therein when the extension apparatus is in the cargo-bed extension configuration. Preferably, the tailgate side panel receiver further comprises a releasable lock mechanism associated with the tailgate side panel receiver to lock the extension apparatus in the cargo-bed extension configuration. In one aspect, the releasable lock mechanism preferably comprises a spring loaded lock pin that is coupled to the side panel receiver and that is engageable with the edge of the side panel.

In a preferred embodiment, the tailgate side panel receiver is a first tailgate side panel receiver that is securable to a first end of the tailgate and the extension apparatus further comprises a second tailgate side panel receiver that is securable to a second end of the tailgate opposite the first tailgate side panel receiver. The second tailgate side panel receiver is configured to receive a portion of the second side panel when the rear panel is pivoted to the cargo-bed extension configuration.

When the first and second tailgate side panel receivers are present in a given embodiment, the first and second tailgate receivers each have a releasable lock mechanism associated with them to lock the extension apparatus in the cargo-bed extension configuration. Preferably, each of the releasable lock mechanisms comprise a spring loaded lock pin that is coupled to each of the first and second tailgate side panel receivers and that is engageable with the edge of the first and second side panels.

In another embodiment, there is provided a vehicle having a cargo-bed area with opposing first and second side walls, and a loading end. The vehicle comprises a tailgate that is pivotally secured to the vehicle at the loading end. The tailgate is movable between a vertical orientation and a horizontal orientation and has first and second ends and a length therebetween that spans a width of the loading end. The vehicle further comprises an extension apparatus pivotally secured to the tailgate at an outer edge of the tailgate, including: 1) a rear panel that is pivotally coupled to the tailgate to pivot the rear panel between a side-board configuration and a cargo-bed extension configuration wherein the rear panel has opposing first and second ends and a length therebetween that spans a substantial width of the tailgate; 2) a first side panel that is pivotally coupled to the rear panel adjacent the first end; 3) a second side panel that is pivotally coupled to the rear panel adjacent the second end; 4) a side panel receiver that is secured to a selected one of the first or second side walls of the cargo-bed area to receive a portion of the selected one of the first or second side panels therein; the extension apparatus is configured to expand the cargo-bed area in a vertical direction when the rear panel is pivoted to the side-board configuration and to expand the cargo-bed area in a horizontal direction when the rear panel is pivoted to the cargo-bed extension configuration; and 4) a tailgate side panel receiver that is secured to the tailgate to receive a portion of a selected one of the first or second side panels therein when the extension apparatus is in the cargo-bed extension configuration.

In a preferred aspect of this particular embodiment, the vehicle further comprises a releasable lock mechanism associated with each of the side panels and the tailgate side panel receivers to lock the extension apparatus in a selected one of the side-board configuration or the cargo-bed extension configuration.

In a more preferred embodiment, the side panel receiver is a first panel receiver secured to the first side wall and the extension apparatus further comprises a second side panel receiver that is secured to the second side wall of the cargo-bed area opposite the first side panel receiver. The second side panel receiver is configured to receive a portion of the second side panel when the rear panel is pivoted to the side-board configuration.

In another aspect to this embodiment, the rear panel is preferably pivotally coupled to the tailgate by a double-jointed hinge that allows the extension apparatus to be pivoted to a loading position wherein the extension apparatus is positioned below the cargo-bed area. Additionally, each of the first and second side panels are pivotally coupled to the rear panel by an offset hinge.

In yet another aspect the tailgate side panel receiver is a first tailgate side panel receiver that is secured to the first end of the tailgate and the extension apparatus further comprises a second tailgate side panel receiver that is secured to the second end of the tailgate opposite the first tailgate side panel receiver. The second tailgate side panel receiver is configured to receive a portion of the second side panel when the rear panel is pivoted to the cargo-bed extension configuration.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention offers a cargo-area extension apparatus that is configured and designed to be selectively positioned in one of three function positions. As discussed below, the present invention functions as a cargo-area extension apparatus that extends the length of the cargo-area in a horizontal direction with respect to the cargo-area. Alternatively, it can assume a side-board configuration that extends the height of a portion of a vehicles cargo-area, or it can assume a loading position where the apparatus hangs below the cargo-area to allow easy loading and unloading of large objects.

Figure 1A:
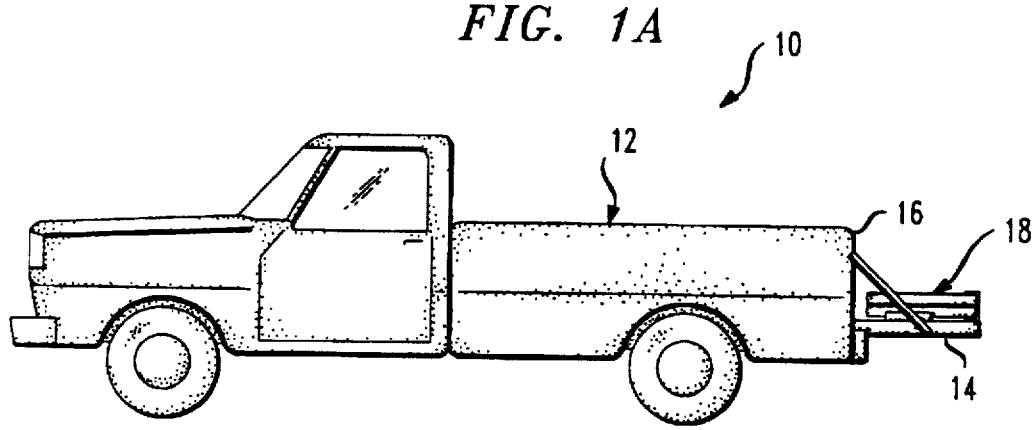
FIG. 1A illustrates a side view of a vehicle and its tailgate in a horizontal position and the expansion apparatus in a folded storage configuration.

Referring initially to FIG. 1A, there is illustrated, in a preferred embodiment, a side view of a vehicle 10 having a cargo-area 12 and a tailgate 14 that is coupled to a loading end 16 of the cargo-area 12. As shown, the tailgate 14 is in a horizontal position. The extension apparatus 18 of the present invention is pivotally coupled to the tailgate 14 and is in a folded storage configuration. The extension apparatus 18 has particular application to pick-ups or trucks that have a cargo-area, however, it will be appreciated that the extension apparatus 18 may also be used in various types of vehicles that have cargo-areas with tailgates associated therewith. The extension apparatus 18 can be conveniently folded onto the tailgate 14 in a storage configuration when not in use.

Figure 1B:
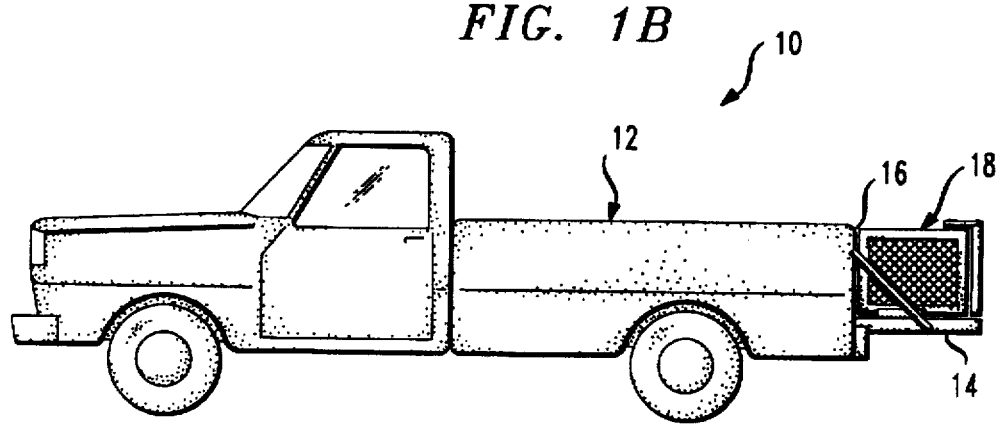
FIG. 1B illustrates a side view of a vehicle with its tailgate in a horizontal position and the expansion apparatus in a cargo-area expansion configuration.

Turning now to FIG. 1B, there is illustrated a side view of the vehicle 10 with its tailgate 14 (shown in phantom) in a horizontal position and the extension apparatus 18 in a cargo-area expansion configuration. The cooperation of the extension apparatus 18 with the tailgate 14 provides the vehicle with a horizontal expansion area that extends the cargo-area 12 approximately the same distance as the tailgate's 14 extension from the end of the cargo-area 12.

Figure 1C:
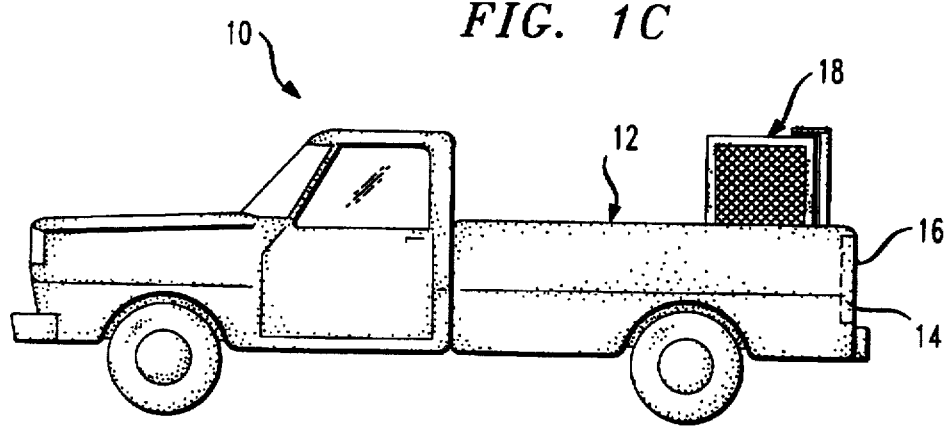
FIG. 1C illustrates a side view of a vehicle with its tailgate in a vertical position and the expansion apparatus in a side-board configuration.

Referring now to FIG. 1C, there is illustrated a side view of the vehicle 10 with its tailgate 14 in a vertical position and the extension apparatus 18 in a side-board configuration. This configuration offers a unique aspect of the present invention not found in the prior art devices discussed above. Prior to the present invention, if a user desired to add a side-board to the vehicle, the user had to purchase a separate device that could serve the function of side-boards. Thus, the user would have to purchase two separate devices if he desired to have both the cargo-area extension configuration and the side-board configuration. As the tailgate 14 is pivoted to a vertical position as shown, the extension apparatus 18 pivots with respect to the tailgate 14 to a position above the cargo-area 12 and thereby provides side-boards for the vehicle 10 for carrying loads that rise above the wall of the cargo-area 12.

Figure 1D:
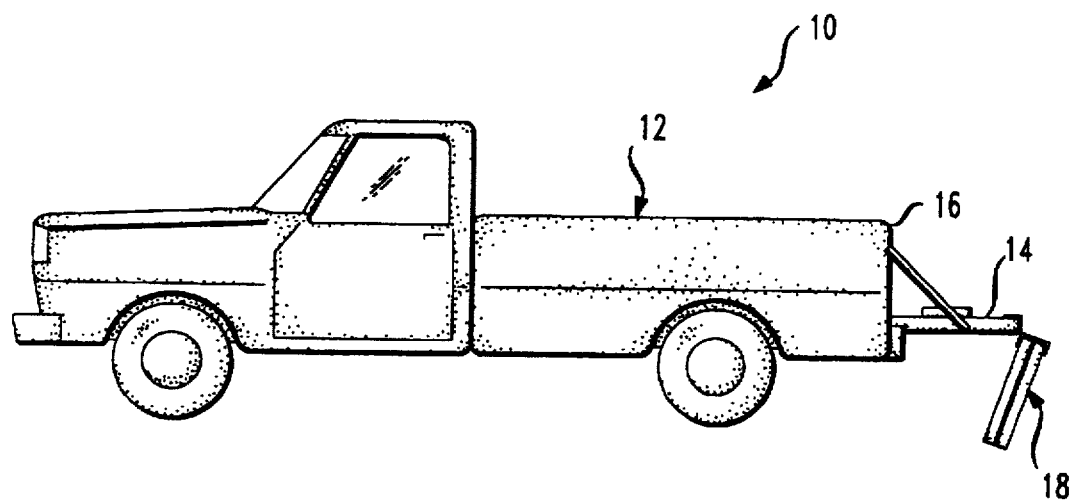
FIG. 1D illustrates a side view of a vehicle with its tailgate in a horizontal position and the expansion apparatus positioned below the cargo-area and in a loading position.

Turning now to FIG. 1D, there is illustrated a side view of the vehicle 10 with its tailgate 14 in a horizontal position and the extension apparatus 18 positioned below the cargo-area 12 and in a loading position to allow the loading or unloading of objects, particularly large, heavy objects.

Figure 2:
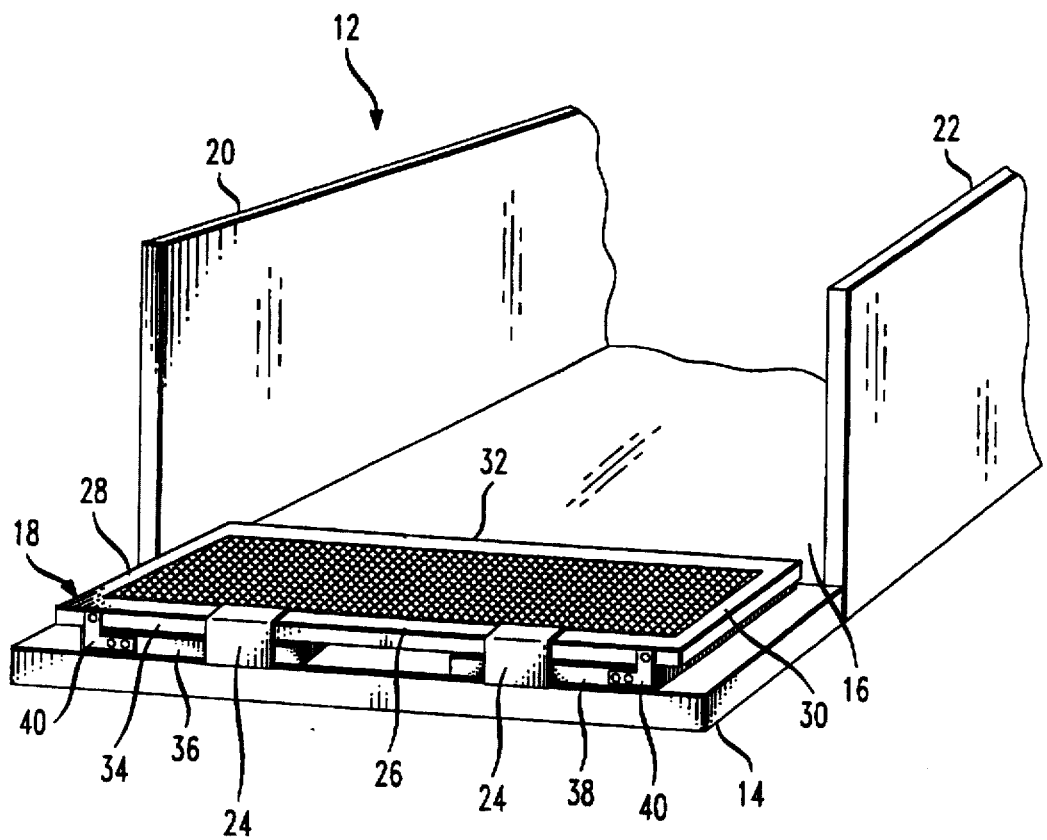
FIG. 2 illustrates an isometric view of a loading end portion of a vehicle with its tailgate in a horizontal position and the expansion apparatus in a folded storage position.
Figure 2A:
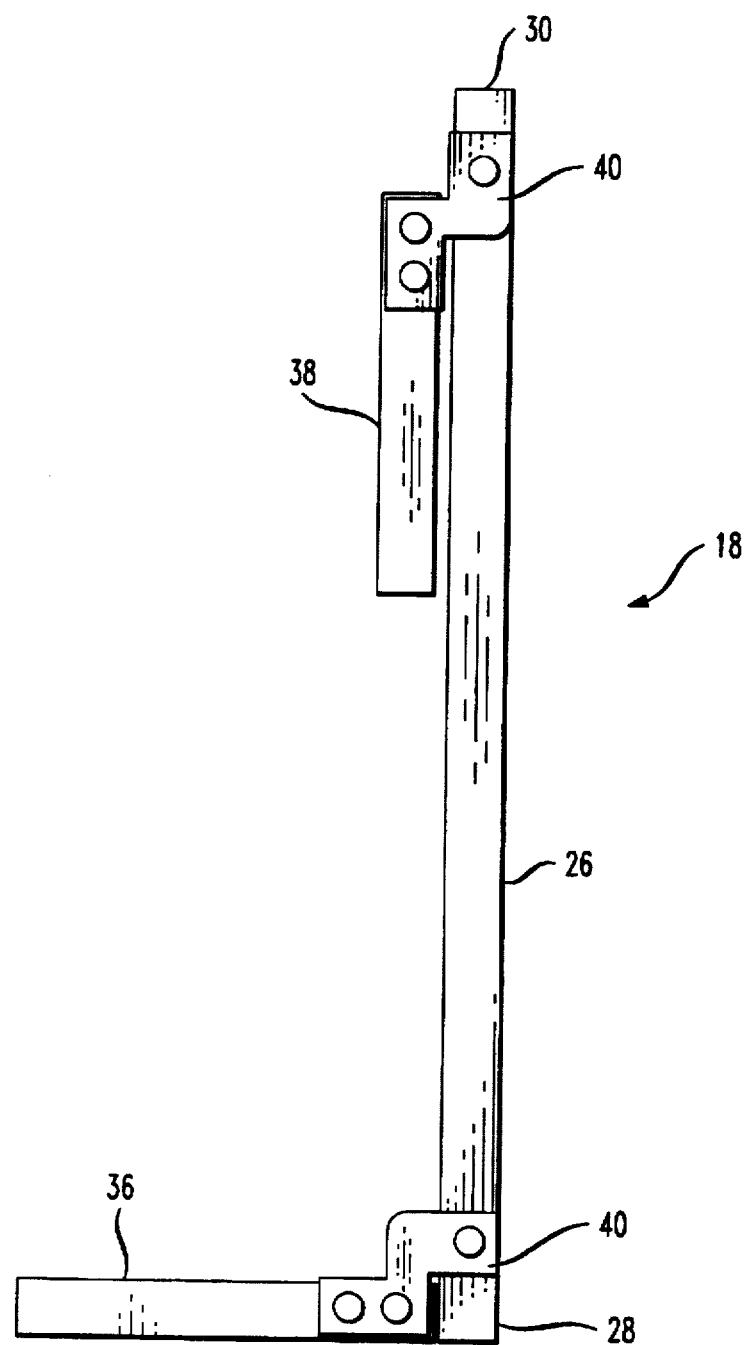
FIG. 2A illustrates a top view of the expansion apparatus showing the offset hinges that pivotally couple side panels to opposing ends of a rear panel.

Referring now to FIG. 2, there is illustrated an isometric view of the loading end 16 of the cargo-area 12. The cargo-area 12 has opposing first and second side walls 20,22 with the loading end 16, of course, positioned rearwardly from the front of the cargo-area 12. Pivotally coupled to the loading end 16 is the tailgate 14 that is associated with the cargo-area 12. As illustrated, the tailgate 14 is in a horizontal position and the extension apparatus 18, which is coupled to the tailgate 14 preferably by a pair of hinges 24, is in a folded storage position. As explained in more detail below of a preferred embodiment, the extension apparatus 18 has a generally rectangular shape and is comprised of: 1) a rear panel 26 having opposing first and second ends 28,30 and top and bottom edges 32,34, 2) a first side panel 36 pivotally coupled to the rear panel 26 adjacent the first end 28, and 3) a second side panel 38 pivotally coupled to the rear panel 26 adjacent the second end 30. The first and second side panels 36,38 are each preferably pivotally coupled to the rear panel 26 by an offset hinge 40, which is more clearly illustrated in FIG. 2A. Preferably, there are two pair of such offset hinges 40 that couple the first and second side panels 36,38 to the rear panel 26; one on the top edge 32 and one on the bottom edge 34 of the first and second ends 28,30. As shown in FIG. 2A, the offset hinge 40 allows the first and second side panels 36,38 to individually pivot to a perpendicular orientation with respect to the rear panel 26. When in the folded storage position, the first and second side panels 28,30 preferably fold to lie under the rear panel 26. This position allows the weight of the rear panel 26 to keep the extension apparatus 18 in a folded storage position even when the tailgate 14 is in a vertical position.

Figure 3:
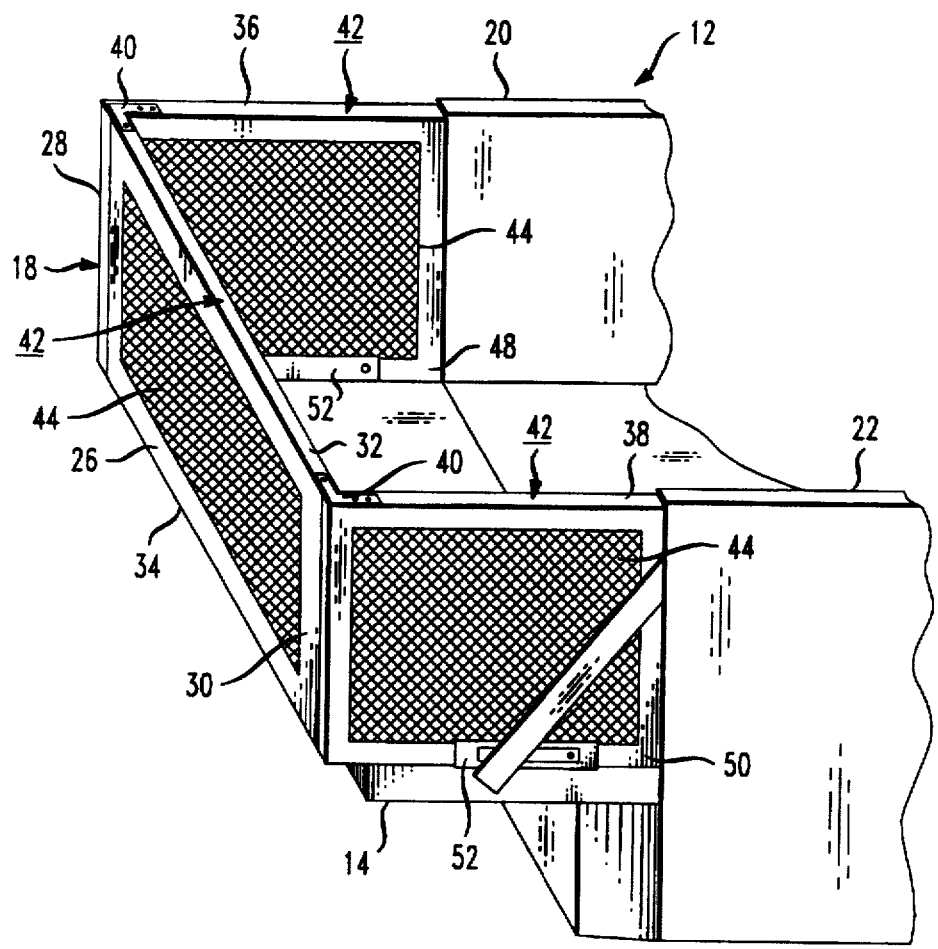
FIG. 3 illustrates an isometric view of a loading end portion of a vehicle with its tailgate in a horizontal position and the expansion apparatus in a cargo-area expansion configuration.

Turning now to FIG. 3, there is illustrated an isometric view of the cargo-area 12 with its tailgate 14 in a horizontal position and the extension apparatus 18 in a cargo-area expansion configuration. Preferably, the rear panel 26 and the first and second side panels 36,38 have a generally rectangular shape and are comprised of a tubular frame 42 with the open portion of the tubular frame 42 covered by a sturdy wire mesh 44. In a preferred embodiment, the rear panel 26 is constructed from a light-weight tubular metal, such as aluminum, however, it is, of course, recognized that many other rigid materials, such as steel or heavy plastic may also be used in constructing the rear panel 26. The length of the rear panel 26 may vary depending on the design. However, it is preferred that the rear panel 26 have a length that is sufficient to span a substantial length of the tailgate 14. What is meant by "substantial length" is that the length of the rear panel 26 is such that it spans most of the length of the tailgate 14 but does not obstruct the closing of the tailgate 14.

In a preferred embodiment, the first and second side panels 36,38 are also comprised of tubular frames 42 with the open portion covered by the same sturdy wire mesh 44 and may also be constructed from the same materials as mentioned for the rear panel 26 with the preferred material being the light-weight tubular metal. The length of the first and second side panels 36,38 may vary depending on the design. However, it is preferred that their length be such that each spans a substantial width of the tailgate 14, thereby maximizing the extension of the cargo-area 12. Bottom edges 48, 50 of the first and second side panels 36,38 are designed to be received in a tailgate side panel receiver 52, which is discussed in more detail below. While the tailgate side panel receiver 52 is optional in the present invention, it is preferred that at least one be positioned on a selected end of the tailgate 14 to engage the selected side panel. It is more preferable, however, that a tailgate side panel receiver 52 be positioned on each end of the tailgate 14 to engage the first and second side panels 36,38, respectively, as shown in FIG. 3.

Figure 3A:
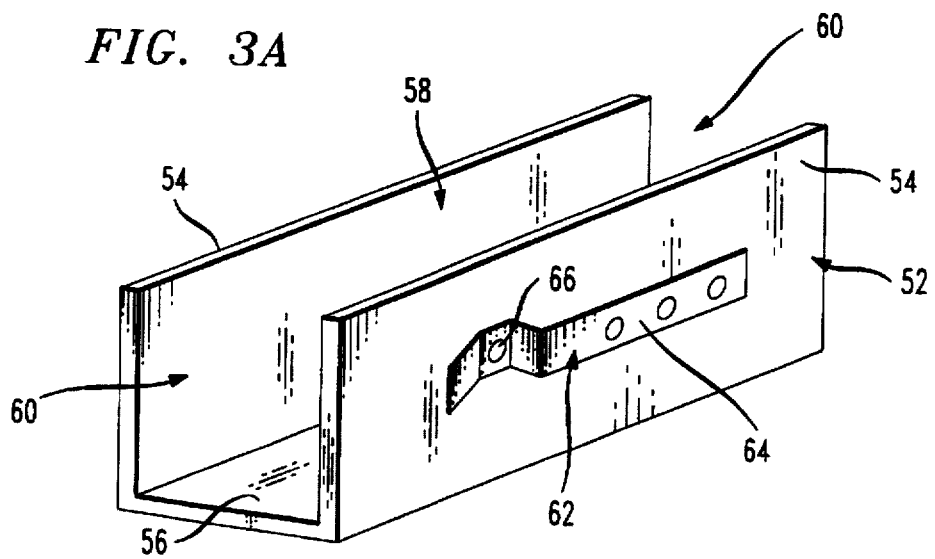
FIG. 3A illustrates an isometric view of a tailgate side panel receiver having a spring loaded lock pin secured thereto.
Figure 3B:
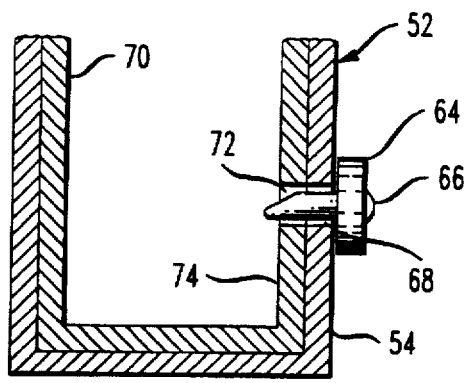
FIG. 3B illustrates an end view of the tailgate side panel receiver of FIG. 2A with the lock pin extending through an opening in a side wall of the tailgate side panel receiver and into the interior of a side panel frame.

A preferred embodiment of the tailgate side panel receiver 52 is illustrated in FIG. 3A. As shown, the tailgate side panel receiver 52 has a generally "U" or channel shape having side walls 54, a bottom wall 56, an interior channel portion 58, and open ends 60. The width of the tailgate side panel receiver 52 is such that it can receive a bottom edge of the selected side panel (FIG. 3B) with which it is used. The tailgate side panel receiver 52 can be secured to the tailgate 14 using conventional techniques, such as bolting it to the tailgate 14 or welding it to the tailgate 14 if so desired. In a preferred embodiment, the tailgate side panel receiver 52 has associated therewith, a spring loaded lock pin mechanism 62, which is preferably secured to an exterior side of its side wall 54. The spring loaded lock pin 62 comprises a spring member 64 that is secured to the wall 54 and a pin 66 secured to spring member 64. As the spring member 64 biases the pin 66 toward the tailgate side panel receiver 52, the pin 66 is received through an opening 72 formed in the wall 54 (FIG. 3B). The side panel 70 that is received in the tailgate side panel receiver 52 has a corresponding opening 72 in its bottom side edge 74 that aligns with the position of the pin 66 when the side panel 70 is received in the tailgate side panel receiver 52, as shown in FIG. 3B. After the side panel 70 is properly positioned, the spring member 64 urges the pin 66 through the opening 72 in the tailgate panel receiver 52 and into the corresponding opening 72 in the bottom side edge 74 of the side panel 70. While the spring loaded lock pin 62 has been specifically discussed and illustrated, it should be appreciated that many other locking devices, such as springs positioned within the channel, spring pins, bolts, etc. could be used in place of the spring loaded lock pin 62.

Figure 4:
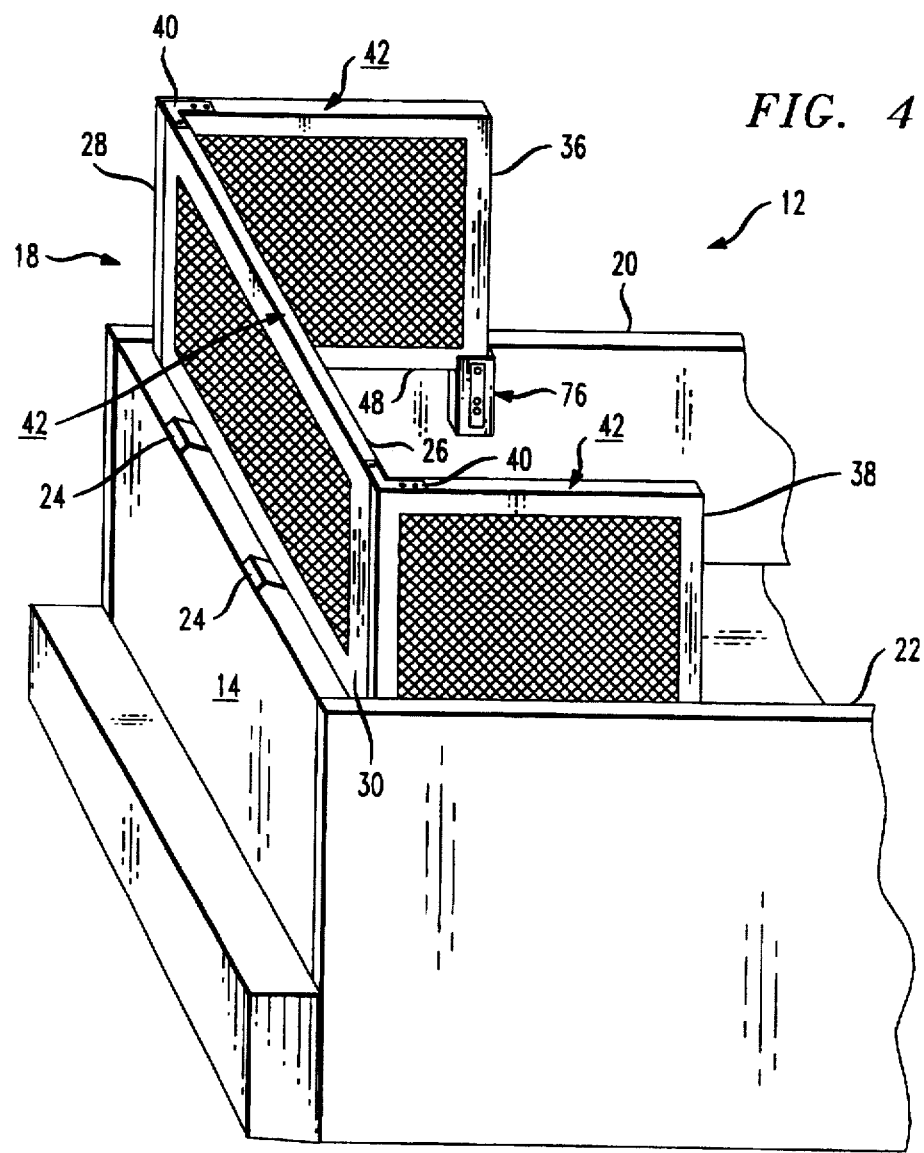
FIG. 4 illustrates an isometric view of a loading end portion of a vehicle with its tailgate in a vertical position and the expansion apparatus in a side-board configuration.

Referring now to FIG. 4, there is illustrated an isometric view of the cargo-area 12 with its tailgate 14 in a vertical position and the extension apparatus 18 in a side-board configuration. As illustrated in FIG. 4, the bottom edge 48 of the first side panel 36 is received in a side panel receiver 76. Preferably, both the first and second side panels 36,38 are each received in a side panel receiver 76. In a preferred embodiment, the side panel receiver 76 has a generally rectangular, tubular shape and is positioned on a wall of the cargo-area 12 such that it receives a bottom edge of the side panel when the extension apparatus 18 is pivoted to the side-board configuration. As previously mentioned, in a preferred embodiment, there is a side panel receiver 76 positioned on each of the walls 20,22 of the cargo-area 12 so that both the first and second side panels 36,38 are supported.

Figure 4A:
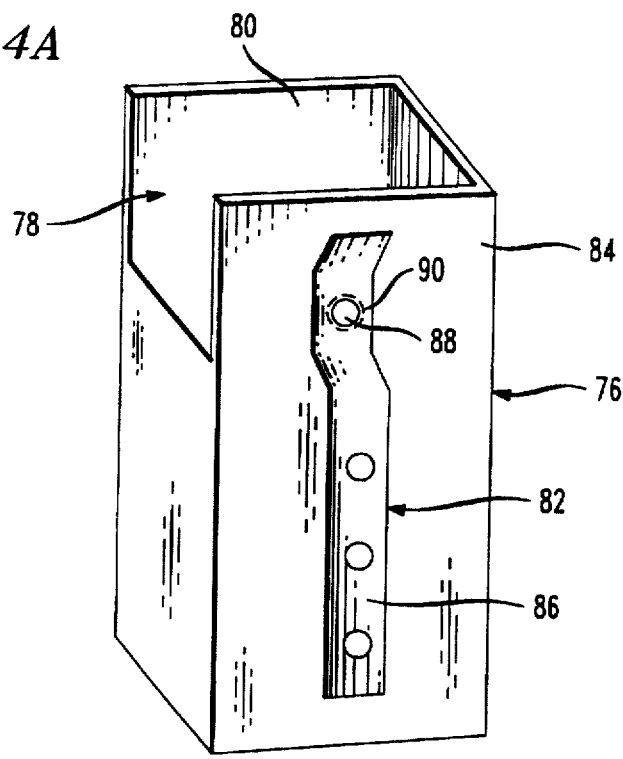
FIG. 4A illustrates an isometric view of a side panel receiver having a spring loaded lock pin secured thereto.

Referring now to FIG. 4A, in a preferred embodiment thereof, the side panel receiver 76 has a cut-out portion 78 in a top portion 80 of the side panel receiver 76 that is configured to receive a portion of the bottom edge of the side panel, preferably the bottom corner portion. The side panel receiver 76 has associated therewith a spring loaded lock pin mechanism 82, which is preferably secured to an exterior side of its side wall 84. The spring loaded lock pin 82 comprises a spring member 86 that is secured to the wall 84 and a pin 88 secured to spring member 86. The pin 88 is received through an opening 90 (shown in phantom) formed in the wall 84. The spring member 86 biases, the pin 66 through the opening 90. The side panel 70 previously described in FIG. 3B in cooperation with the tailgate side panel receiver is also applicable with respect to the side panel receiver 76. Therefore, reference to the side panel 70 as illustrated in FIG. 3B will be made in discussing its cooperation with the side panel receiver 76. The side panel 70 has a corresponding opening 72 (FIG. 3B) in its bottom edge 74 that aligns with the position of the pin 88 when the side panel 70 is received in the side panel receiver 76. After the side panel 70 is properly positioned, the spring member 86 urges the pin 88 through the opening 90 in the side panel receiver 76 and into the corresponding opening 72 (FIG. 3B) in the bottom edge 74 of the side panel 70. While the spring loaded lock pin 82 has been specifically discussed and illustrated, it should be appreciated that many other locking devices, such as springs positioned within the channel, spring pins, bolts, etc. could be used in place of the spring loaded lock pin 86.

Figure 4B:
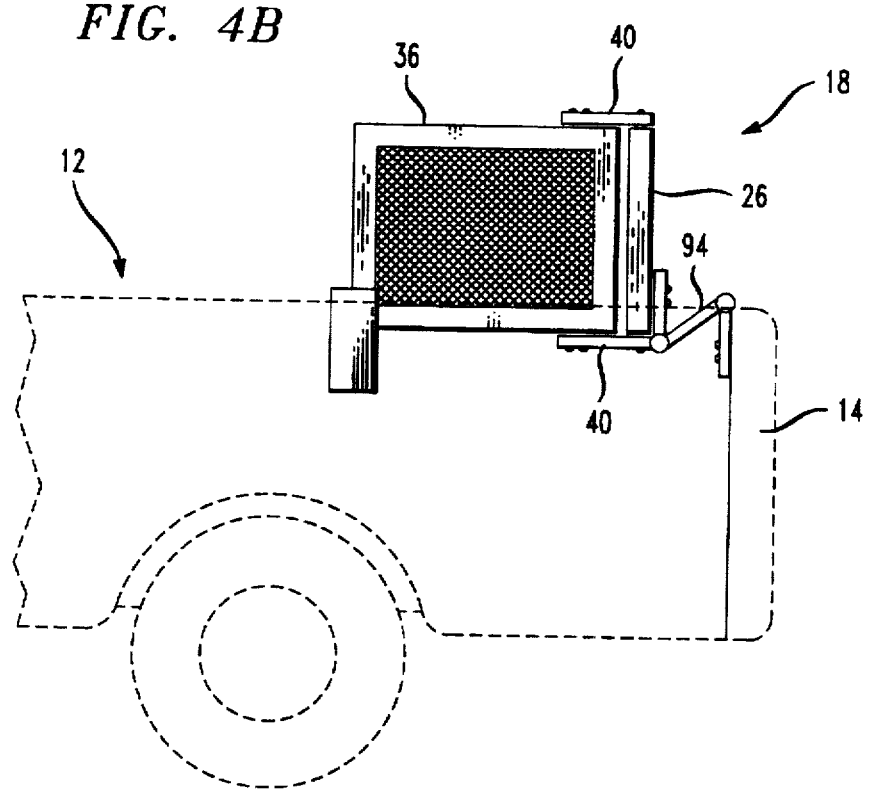
FIG. 4B illustrates a side view of a loading end portion of a vehicle with its tailgate in a vertical position and the expansion apparatus in a side-board configuration coupled to the tailgate by a double-jointed hinge.

Turning now to FIG. 4B, there is illustrated a side view of the cargo-area 12 with its tailgate 14 in a vertical position and the expansion apparatus in a side-board configuration coupled to the tailgate by double-jointed hinge 94. The double-jointed hinge 94, which is preferably a "Z" hinge (i.e. a hinge that can be positioned in the shape of a "Z"), allows the extension apparatus 18 to easily achieve all of the configurations discussed herein. As shown, the double-jointed hinge 94 is secured in a conventional manner to the outer edge of the tailgate 14 and to the lower edge of the rear side panel 26. While other hinges can be used, the double-jointed hinge 94 is preferred because it allows the extension apparatus 18 to easily achieve the various configurations discussed herein without undue torque or strain on the double-jointed hinge 94 or the extension apparatus 18 in general. In addition, it also allows the extension apparatus 18 to be more easily positioned in proper alignment with respect to the tailgate side panel receivers 52 and the side panel receivers 76. From the above description, it is apparent that the present invention provides, for use with a vehicle having a cargo-bed area with opposing first and second side walls, and a tailgate movable between a vertical orientation and a horizontal orientation, an extension apparatus. In a preferred embodiment, the extension apparatus comprises a rear panel, which has opposing first and second ends, pivotally couplable to the tailgate to pivot the rear panel between a side-board configuration and a cargo-bed extension configuration. A first side panel is pivotally coupled to the rear panel adjacent the first end, and a second side panel is pivotally coupled to the rear panel adjacent the second end. The extension apparatus further includes a side panel receiver securable to a selected one of the first or second side walls of the cargo-bed area to receive a portion of the selected one of the first or second side panels therein. The unique configuration of the extension apparatus allows the extension apparatus to expand the cargo-bed area in a vertical direction when the rear panel is pivoted to the side-board configuration, or alternatively, to expand the cargo-bed area in a horizontal direction when the rear panel is pivoted to the cargo-bed extension configuration.

Although the present invention and its advantages have been described in detail, those skilled in the art should understand that they can make various changes, substitutions and alterations herein without departing from the spirit and scope of the invention in its broadest form.

What is claimed is:

1. For use with a vehicle having a cargo-bed area with opposing first and second side walls, and a tailgate movable between a vertical orientation and a horizontal orientation, an extension apparatus, comprising:

a rear panel pivotally couplable to said tailgate to pivot said rear panel between a side-board configuration and a cargo-bed extension configuration, said rear panel having opposing first and second ends;

a first side panel pivotally coupled to said rear panel adjacent said first end;

a second side panel pivotally coupled to said rear panel adjacent said second end;

a side panel receiver securable to a selected one of said first or second side walls of said cargo-bed area to receive a portion of said selected one of said first or second side panels therein, said side panel including a releasable lock mechanism associated with said side panel receiver to lock said extension apparatus in said side-board configuration, said extension apparatus configured to expand said cargo-bed area in a vertical direction when said rear panel is pivoted to said side-board configuration and to expand said cargo-bed area in a horizontal direction when said rear panel is pivoted to said cargo-bed extension configuration; and a tailgate side panel receiver securable to said tailgate to receive a portion of a selected one of said first or second side panels therein when said extension apparatus is in said cargo-bed extension configuration.

2. The extension apparatus of claim 1 wherein each of said first and second side panels are pivotally coupled to said rear panel by an offset hinge.

3. The extension apparatus of claim 1 wherein said releasable lock mechanism comprises a spring loaded lock pin coupled to said side panel receiver and engageable with an edge of said panel receiver.

4. The extension apparatus of claim 1 wherein said side panel receiver is a first panel receiver securable to said first side wall and said extension apparatus further comprises a second side panel receiver securable to said second side wall of said cargo-bed area opposite said first side panel receiver, said second side panel receiver configured to receive a portion of said second side panel when said rear panel is pivoted to said side-board configuration.

5. The extension apparatus of claim 4 further comprising a releasable lock mechanism associated with each of said first and second panel receivers to lock said extension apparatus in said side-board configuration.

6. The extension apparatus of claim 5 wherein each of said releasable lock mechanisms comprise a spring loaded lock pin coupled to each of said first and second side panel receivers and engageable with an edge of said first and second side panels.

7. The extension apparatus of claim 1 wherein said rear panel is pivotally coupled to said tailgate by a double-jointed hinge, said double-jointed hinge allowing said extension apparatus to be pivoted to a loading position wherein said extension apparatus is positioned below said cargo-bed area.

8. The extension apparatus of claim 7 wherein said double-jointed hinge member is a Z-hinge.

9. The extension apparatus of claim 1 wherein said tailgate side panel receiver further comprises a releasable lock mechanism associated with said tailgate side panel receiver to lock said extension apparatus in said cargo-bed extension configuration.

10. The extension apparatus of claim 9 wherein said releasable lock mechanism comprises a spring loaded lock pin coupled to said side panel receiver and engageable with an edge of side panel.

11. The extension apparatus of claim 1 wherein said tailgate side panel receiver is a first tailgate side panel receiver securable to a first end of said tailgate and said extension apparatus further comprises a second tailgate side panel receiver securable to a second end of said tailgate opposite said first tailgate side panel receiver, said second tailgate side panel receiver configured to receive a portion of said second side panel when said rear panel is pivoted to said cargo-bed extension configuration.

12. The extension apparatus of claim 11 further comprising a releasable lock mechanism associated with each of said first and second tailgate side panel receivers to lock said extension apparatus in said cargo-bed extension configuration.

13. The extension apparatus of claim 12 wherein each of said releasable lock mechanisms comprise a spring loaded lock pin coupled to each of said first and second tailgate side panel receivers and engageable with an edge of said first and second side panels.

14. A vehicle having a cargo-bed area with opposing first and second side walls, and a loading end, comprising:

a tailgate pivotally secured to said vehicle at said loading end, said tailgate movable between a vertical orientation and a horizontal orientation and having first and second ends and a length therebetween that spans a width of said loading end; and an extension apparatus pivotally secured to said tailgate at an outer edge of said tailgate, including:

a rear panel pivotally coupled to said tailgate to pivot said rear panel between a side-board configuration and a cargo-bed extension configuration, said rear panel having opposing first and second ends and a length therebetween that spans a substantial width of said tailgate;

a first side panel pivotally coupled to said rear panel adjacent said first end;

a second side panel pivotally coupled to said rear panel adjacent said second end;

a side panel receiver secured to a selected one of said first or second side walls of said cargo-bed area to receive a portion of said selected one of said first or second side panels therein, said side panel receiver including a first panel receiver secured to said first side wall and said extension apparatus further comprising a second side panel receiver secured to said second side wall of said cargo-bed area opposite said first side panel receiver, said second side panel receiver configured to receive a portion of said second side panel when said rear panel is pivoted to said side-board configuration, said extension apparatus configured to expand said cargo-bed area in a vertical direction when said rear panel is pivoted to said side-board configuration and to expand said cargo-bed area in a horizontal direction when said rear panel is pivoted to said cargo-bed extension configuration; and a tailgate side panel receiver secured to said tailgate to receive a portion of a selected one of said first or second side panels therein when said extension apparatus is in said cargo-bed extension configuration.

15. The vehicle of claim 14 further comprising a releasable lock mechanism associated with each of said side panel and said tailgate side panel receivers to lock said extension apparatus in a selected one of said side-board configuration or said cargo-bed extension configuration.

16. The vehicle of claim 14 wherein said rear panel is pivotally coupled to said tailgate by a double-jointed hinge, said double-jointed hinge allowing said extension apparatus to be pivoted to a loading position wherein said extension apparatus is positioned below said cargo-bed area.

17. The vehicle of claim 14 wherein each of said first and second side panels are pivotally coupled to said rear panel by an offset hinge.

18. The extension apparatus of claim 14 wherein said tailgate side panel receiver is a first tailgate side panel receiver secured to said first end of said tailgate and said extension apparatus further comprises a second tailgate side panel receiver secured to said second end of said tailgate opposite said first tailgate side panel receiver, said second tailgate side panel receiver configured to receive a portion of said second side panel when said rear panel is pivoted to said cargo-bed extension configuration.

* * * * *